(12) United States Patent
Dajaku

(10) Patent No.: US 11,374,453 B2
(45) Date of Patent: Jun. 28, 2022

(54) WINDING SYSTEM FOR A STATOR OF AN ELECTRIC MACHINE AND ELECTRIC MACHINE

(71) Applicant: MOLABO GmbH, Ottobrunn (DE)

(72) Inventor: Gurakuq Dajaku, Neubiberg (DE)

(73) Assignee: MOLABO GMBH, Ottobrunn (DE)

( * ) Notice: Subject to any disclaimer, the term of this patent is extended or adjusted under 35 U.S.C. 154(b) by 282 days.

(21) Appl. No.: 16/631,434

(22) PCT Filed: Jul. 17, 2018

(86) PCT No.: PCT/EP2018/069382
§ 371 (c)(1),
(2) Date: Jan. 15, 2020

(87) PCT Pub. No.: WO2019/016203
PCT Pub. Date: Jan. 24, 2019

(65) Prior Publication Data
US 2020/0185994 A1    Jun. 11, 2020

(30) Foreign Application Priority Data
Jul. 18, 2017  (DE) ...................... 10 2017 116 145.7

(51) Int. Cl.
| H02K 3/28 | (2006.01) |
| H02K 11/33 | (2016.01) |
| H02K 1/16 | (2006.01) |
| H02K 1/24 | (2006.01) |

(52) U.S. Cl.
CPC .............. *H02K 3/28* (2013.01); *H02K 1/16* (2013.01); *H02K 1/24* (2013.01); *H02K 11/33* (2016.01)

(58) Field of Classification Search
CPC . H02K 3/12; H02K 3/28; H02K 11/20; H02K 11/33; H02K 17/14; H02K 17/30; H02K 19/36
See application file for complete search history.

(56) References Cited

U.S. PATENT DOCUMENTS

| 2003/0178896 A1 | 9/2003 | Crane |
| 2003/0205986 A1 | 11/2003 | Edelson |
| 2005/0040716 A1 | 2/2005 | Schmid et al. |

(Continued)

FOREIGN PATENT DOCUMENTS

| CN | 106411082 A | 2/2017 |
| DE | 102005032965 A1 | 3/2007 |

(Continued)

*Primary Examiner* — Quyen P Leung
*Assistant Examiner* — Minki Chang
(74) *Attorney, Agent, or Firm* — Morgan, Lewis & Bockius LLP

(57) ABSTRACT

A winding system for a stator of an electric machine is specified. The winding system comprises at least two first conductor segments and at least two second conductor segments, at least two half-bridges, at least one first short-circuit means and at least one second short-circuit means. Each half-bridge is connected to least one first conductor segment and one second conductor segment, each first conductor segment is connected to the first short-circuit means, and each second conductor segment is connected to the second short-circuit means. Further, an electric machine having a winding system is specified.

14 Claims, 11 Drawing Sheets

(56) References Cited

U.S. PATENT DOCUMENTS

| | | |
|---|---|---|
| 2007/0273218 A1 | 11/2007 | Atkinson |
| 2016/0028284 A1 | 1/2016 | Dajaku |
| 2016/0087497 A1 | 3/2016 | Patzak et al. |
| 2016/0105063 A1* | 4/2016 | Bachheibl .............. H02K 11/33 310/68 R |
| 2016/0173019 A1* | 6/2016 | Dajaku ................... H02P 27/04 318/498 |
| 2017/0047804 A1* | 2/2017 | Dajaku ................... H02K 3/12 |

FOREIGN PATENT DOCUMENTS

| | | |
|---|---|---|
| DE | 102014105642 A1 | 10/2015 |
| DE | 102014110299 A1 | 1/2016 |
| DE | 102014113489 A1 | 3/2016 |
| DE | 102014114615 A1 | 5/2016 |
| DE | 102014118356 A1 | 6/2016 |

* cited by examiner

WINDING SYSTEM FOR A STATOR OF AN ELECTRIC MACHINE AND ELECTRIC MACHINE

FIELD

The present application relates to a winding system for a stator of an electric machine and an electric machine.

BRIEF SUMMARY OF THE DISCLOSURE

The electric machine can comprise a stator and a rotor moveably mounted relative thereto. Electric machines can be operated as a motor or as a generator. The stator can comprise an electric winding in slots which is formed of an electrically conductive material and, for example, has the shape of bars. The electric winding is connected to a power supply unit, which can be multi-phase. A separate switch or a separate half-bridge is required for each phase. As many switches or half-bridges as slots are required in the case where each slot has its own phase.

The distribution of the magnetomotive force of a rotating field generated by the stator depends on the number of slots or the number of phases. The more slots or phases the stator comprises, the more the distribution of the magnetomotive force approaches the shape of a sinusoidal function. The quality of the rotating field can thus be increased by increasing the number of slots or phases. However, this also increases the number of half-bridges, thus leading to an increased complexity of the winding system and to higher costs.

An object to be solved is to provide an efficient winding system for a stator of an electric machine. A further object to be solved is to specify an electric machine which can be operated efficiently.

The objects are achieved by the subject matter of the independent patent claim and a dependent claim. Advantageous embodiments and further developments are specified in the subclaims.

According to at least one embodiment of the winding system for a stator of an electric machine, the winding system comprises at least two first conductor segments and at least two second conductor segments. The first and second conductor segments can comprise an electrically conductive material such as copper or aluminum. The stator can, for example, comprise slots, in each of which a conductor segment is located. The stator can comprise one or more stator laminations in which the slots are introduced. Preferably, the stator comprises a plurality of slots. The first and second conductor segments can, for example, be electrically conductive bars.

The winding system further comprises at least two half-bridges, wherein each half-bridge is connected to at least one first conductor segment and one second conductor segment. The half-bridges can be connected to a power supply unit and be set up to provide its own phase current. The half-bridges can, for example, be bipolar electronic switches, such as metal oxide semiconductor field effect transistors (MOSFET) or bipolar transistors (IGBT). Each half-bridge is associated with at least one pair of a first conductor segment and a second conductor segment, so that each half-bridge is electrically connected to at least one first conductor segment and one second conductor segment.

The winding system further comprises at least one first short-circuit means and at least one second short-circuit means, wherein each first conductor segment is connected to the first short-circuit means and each second conductor segment is connected to the second short-circuit means. The first conductor segments are electrically conductively connected to each other on a first side of the stator via the first short-circuit means. In addition, the second conductor segments are electrically conductively connected to each other on the first side of the stator via the second short-circuit means. The first conductor segments are thus connected to each other on the first side of the stator in such a way that they form a short-circuit. Further, the second conductor segments are connected to each other on the first side of the stator so as to form a short-circuit. The conductor segments are connected to the half-bridges on a second side of the stator facing away from the first side.

The winding system preferably comprises a plurality of first and second conductor segments. The first and the second conductor segments can be disposed alternately to each other. That is, if the conductor segments are disposed, for example, around the circumference of the stator, a second conductor segment is disposed in both directions along with a first conductor segment along the circumference, respectively. Likewise, two first conductor segments are disposed along with each second conductor segment, wherein a first conductor segment is disposed along the circumference in one direction along with the second conductor segment and a further first conductor segment is disposed along the circumference in the opposite direction along with the second conductor segment. Pairs of conductor segments can thus be disposed along the circumference of the stator, which pairs each comprise one first and one second conductor segment. Each pair of two conductor segments is associated with a half-bridge which is connected to the first conductor segment and the second conductor segment. The half-bridges can be set up to respectively supply the first and second conductor segments of a pair with a phase current.

The winding system can be configured to generate a time-varying rotating field having a set number of poles. If a rotor of the electric machine can interact with the number of pole pairs of the rotating field, then the rotor can be driven by a torque generated by the rotating field. For a winding system comprising only one short-circuit means, as many half-bridges as conductor segments of the winding system are required. However, it has been shown that a winding system comprising at least two short-circuit means and half as many half-bridges as conductor segments can generate a rotating field similar to a winding system having only one short-circuit means. Advantageously, fewer half-bridges are thus required for the winding system described here. If the winding system comprises exactly two short-circuit means, then half as many half-bridges as conductor segments are required. If the winding system comprises more than two short-circuit means, one half-bridge per number of short-circuit means is respectively required.

Since the quality of the rotating field for a winding system having one short-circuit means is similar to the quality of the rotating field of a winding system described here, fewer half-bridges are required for approximately constant quality. The complexity and cost of the winding system can thus be reduced. The winding system is therefore more efficient.

According to at least one embodiment of the winding system, the conductor segments each comprise a single conductor or in each case a plurality of conductor filaments disposed parallel to each other and electrically connected in parallel. The conductor segments can thus each comprise a single electrically conductive wire or bar or be formed using one or more electrically conductive materials. It is also possible for the conductor segments to each comprise a plurality of electrically conductive wires, bars or conductor filaments which are disposed parallel to each other. It is also possible for some conductor segments to each comprise a single conductor and that other conductor segments each comprise a plurality of conductor filaments disposed parallel to each other and electrically connected in parallel. Each conductor segment can thus be supplied with its own electric phase, so that the stator can generate a rotating field. In addition, the production of the stator is simplified if the conductor segments each comprise a single conductor or a plurality of conductor filaments disposed parallel to each other and electrically connected in parallel.

According to at least one embodiment of the winding system, the conductor segments are designed rectilinear and disposed parallel to each other. For example, each conductor segment has the shape of a bar. The stator can thus be constructed similar to a cage rotor, wherein the short-circuit means are attached only on the first side of the stator. The manufacture of the bars and the slots is simplified since the conductor segments are designed rectilinear.

According to at least one embodiment of the winding system, the conductor segments are distributed along a circumference of the stator. For example, if the stator has the shape of a cylinder, the conductor segments can extend in the direction of the longitudinal axis of the cylinder. The conductor segments are disposed next to each other along the circumference of the stator. For example, the conductor segments can have the same radial distance to a center of the stator. Preferably, the conductor segments are disposed equidistant from each other. Since the conductor segments are distributed along the circumference of the stator, the stator can generate a rotating field during operation of the electric machine. The rotating field can drive a rotor during operation of the electric machine, which rotor can be disposed as an internal rotor or as an external rotor.

According to at least one embodiment of the winding system, the number of conductor segments which are connected to the same half-bridge corresponds to the number of short-circuit means of the winding system. This means that if the winding system comprises two short-circuit means, the winding system also comprises at least two first conductor segments both connected to the first short-circuit means, and the winding system comprises at least two second conductor segments both connected to the second short-circuit means. Exactly one first conductor segment and one second conductor segment are thus always connected to the same half-bridge. If the winding system comprises a larger number of short-circuit means, then the number of short-circuit means corresponds to the number of conductor segments which are connected to one and the same half-bridge. In total, fewer half-bridges are thus required than for the case where each half-bridge is connected to only one conductor segment. The complexity and cost of the winding system can thus be reduced.

According to at least one embodiment of the winding system, the winding system comprises at least one third conductor segment and at least one third short-circuit means, wherein each third conductor segment is connected to the third short-circuit means. Each half-bridge is thus connected to one first conductor segment, one second conductor segment and one third conductor segment. It has been shown that even with a winding system having a third short-circuit means, a magnetomotive force similar to that of a winding system having only one short-circuit means can be generated. Since only one third of the number of half-bridges are required in a winding system having three short-circuit means compared with a winding system having one short-circuit means, the complexity and cost of a winding system having three short-circuit means are reduced.

According to at least one embodiment of the winding system, the at least two half-bridges are connected to a power supply unit. The at least two half-bridges are connected to a power supply unit to supply the winding system with phase currents. For example, the power supply unit can be a DC source. In this case, the half-bridges can comprise two switches, which are alternately opened and closed, so that an AC voltage is applied to the conductor segments which are connected to the half-bridges. Since an AC voltage is applied to the conductor segments, the stator can generate a rotating field with the winding system.

According to at least one embodiment of the winding system, each of the at least two half-bridges is set up to provide its own phase current. Each of the half-bridges is thus set up to generate its own phase current. Since each of the half-bridges is connected to at least two conductor segments, the phase current of the respective half-bridge is divided between the respectively connected conductor segments. The phase currents of the winding system can generate a rotating field.

According to at least one embodiment of the winding system, the phase currents are out of phase with each other. This means that the phase currents are temporally offset from each other or phase-shifted in time. The phase currents of the winding system thus generate a rotating field, which is time-varying, so that a torque can be generated in a rotor of the electric machine, in the case where the rotor interacts with the number of pole pairs of the stator.

According to at least one embodiment of the winding system, the short-circuit means are disposed radially along a cross-section through the stator. If the short-circuit means have, for example, the shape of a circle, then the diameter of the first short-circuit means can be greater than the diameter of the second short-circuit means, or vice versa. Along a cross-section through the stator, the short-circuit means are then disposed at the same position along the longitudinal axis of the stator and at different radial positions. Preferably, the short-circuit means are not disposed in direct contact and are electrically isolated from each other. It is thus not necessary to design the stator longer along the longitudinal axis to dispose at least two short-circuit means.

According to at least one embodiment of the winding system, the short-circuit means are disposed at different positions along an axis of rotation of the stator. The axis of rotation can be, for example, a longitudinal axis of the stator. The short-circuit means can further have different diameters. The short-circuit means are offset from each other along the axis of rotation of the stator.

Further, an electric machine is specified. According to at least one embodiment of the electric machine, the electric machine comprises a stator with a winding system as described here. Thus, all features of the described winding system are also disclosed for the winding system of the electric machine and vice versa. The electric machine further comprises a rotor rotatably mounted to the stator. The rotor can be formed, for example, by a cage rotor, a rotor having permanent magnets, a externally excited synchronous rotor, a rotor for a switched reluctance machine, or a rotor for a synchronous reluctance motor. The rotor can be an internal rotor or an external rotor. An air gap can be disposed between the stator and the rotor.

If the rotor of the electric machine can interact with the number of pole pairs of the stator, then the rotor can be driven by the rotating field generated by the stator.

Since the winding system of the stator of the electric machine comprises at least two short-circuit means and each of the half-bridges is connected to at least one first conductor segment and one second conductor segment, the complexity and the cost of the electric machine are reduced. The electric machine can thus be operated more efficiently.

According to at least one embodiment of the electric machine, the stator is designed to generate at least one rotating field in which the number of pole pairs is variable. Each of the at least two half-bridges of the winding system can be set up to provide its own phase current. Each of the at least two half-bridges can also be set up to provide different phase currents. This means that the phase currents provided by the half-bridges can be changed so that the rotating field generated by the stator can comprise different numbers of pole pairs. The number of poles of the rotating field generated by the stator depends on the phase currents provided by the half-bridges. Changing the phase currents can thus change the number of poles of the rotating field generated by the stator.

Advantageously, in the electric machine, the number of pole pairs of the rotating field generated by the stator can be changed without changing the structure of the electric machine. It is thus also possible to change the number of pole pairs when operating the electric machine.

According to at least one embodiment of the electric machine, the stator comprises a plurality of slots, wherein exactly one conductor segment of the winding system is placed per slot. The conductor segments can, for example, have the shape of a rectilinear bar. The production of the stator is thus simplified because of the rectilinear shape of the conductor segments and the slots.

The winding system described here and the electric machine are explained in more detail in the following in connection with embodiments and the associated figures.

DETAILED DESCRIPTION

Figure 1A:
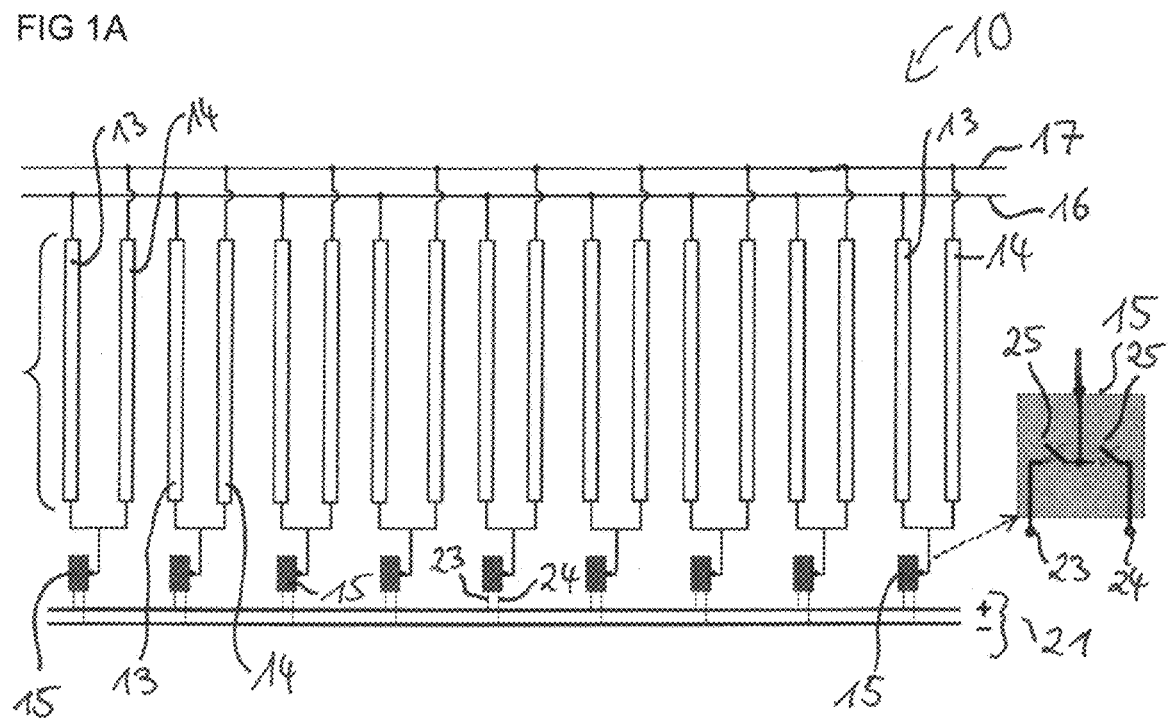
FIGS. 1A and 1B show embodiments of the winding system.

FIG. 1A shows an embodiment of the winding system 10 for a stator 11 of an electric machine 12. The winding system 10 comprises nine first conductor segments 13 and nine second conductor segments 14, each comprising a single bar-shaped conductor. The first conductor segments 13 and the second conductor segments 14 are disposed alternately and next to each other. The first and second conductor segments 13, 14 can, for example, be disposed around the circumference of the stator 11. In addition, the first and second conductor segments 13, 14 are disposed equidistantly.

The winding system 10 further comprises nine half-bridges 15. Each half-bridge 15 is connected to a first conductor segment 13 and a second conductor segment 14. Further, each half-bridge 15 is connected via a first connection 23 to a pole of a power supply unit 21, which in this embodiment is a DC voltage source, and connected via a second connection 24 to the other pole of the DC voltage source. Next to one of the half-bridges 15, an enlargement illustrates that the half-bridges 15 comprise two switches 25. Each of the switches 25 is connected to one of the poles of the DC voltage source. An AC voltage can be provided by the half-bridges 15 by alternately opening and closing the two switches 25. Each half-bridge 15 is thus set up to provide its own phase current. The phase currents can be out of phase with each other to generate a rotating field.

Each first conductor segment 13 is electrically connected to a first short-circuit means 16 on the side facing away from the half-bridges 15. Each second conductor segment 14 is electrically connected to a second short-circuit means 17 on the side facing away from the half-bridges 15. The short-circuit means 16, 17 are disposed on a first side 20 of the stator 11. For example, they can be in the shape of a ring. The first conductor segments 13 are short-circuited with each other via the first short-circuit means 16. The second conductor segments 14 are short-circuited via the second short-circuit means 17.

Since the winding system 10 of the stator 11 of the electric machine 12 comprises at least two short-circuit means 16, 17 and each of the half-bridges 15 is connected to at least one first conductor segment 13 and one second conductor segment 14, the complexity and the cost of the electric machine 12 are reduced. The electric machine 12 can thus be operated more efficiently.

Figure 1B:
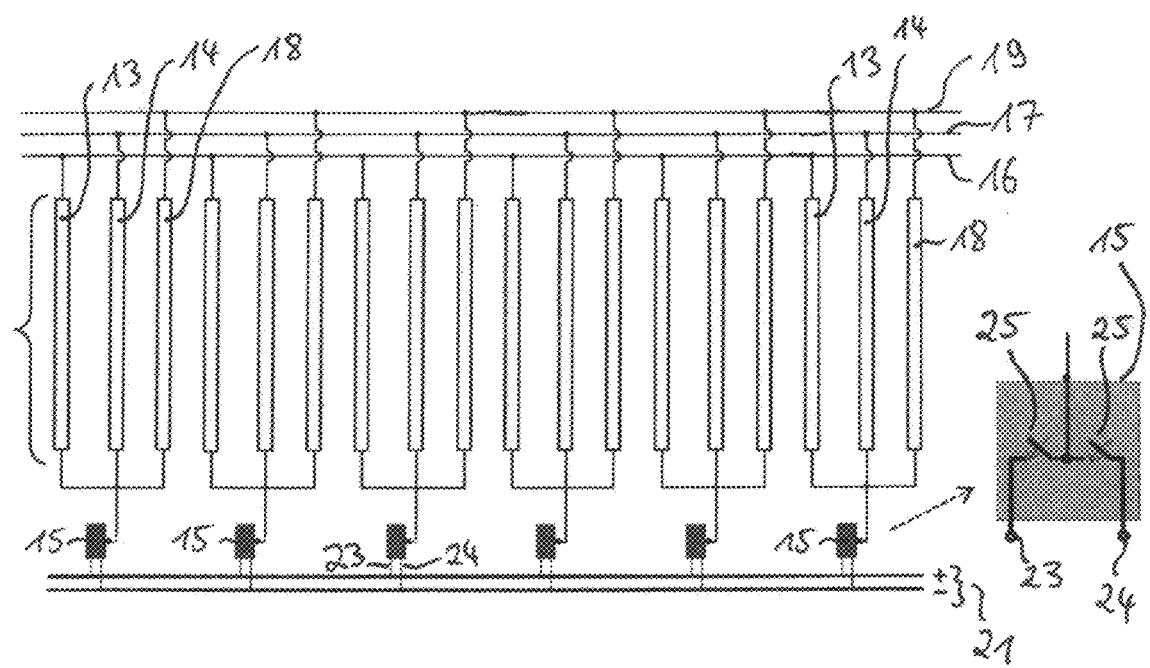

FIG. 1B shows a further embodiment of the winding system 10. The winding system 10 comprises six first conductor segments 13, six second conductor segments 14 and six third conductor segments 18. These are disposed in a similar manner as shown in FIG. 1A. Furthermore, the winding system 10 comprises six half-bridges 15. Each half-bridge 15 is electrically connected to one first conductor segment 13, one second conductor segment 14 and one third conductor segment 18. The half-bridges 15 are connected to a power supply unit 21. In addition, the winding system 10 comprises a first short-circuit means 16, a second short-circuit means 17 and a third short-circuit means 19. All first conductor segments 13 are electrically connected to the first short-circuit means 16. All second conductor segments 14 are electrically connected to the second short-circuit means 17. All third conductor segments 18 are electrically connected to the third short-circuit means 19.

Figure 2A:
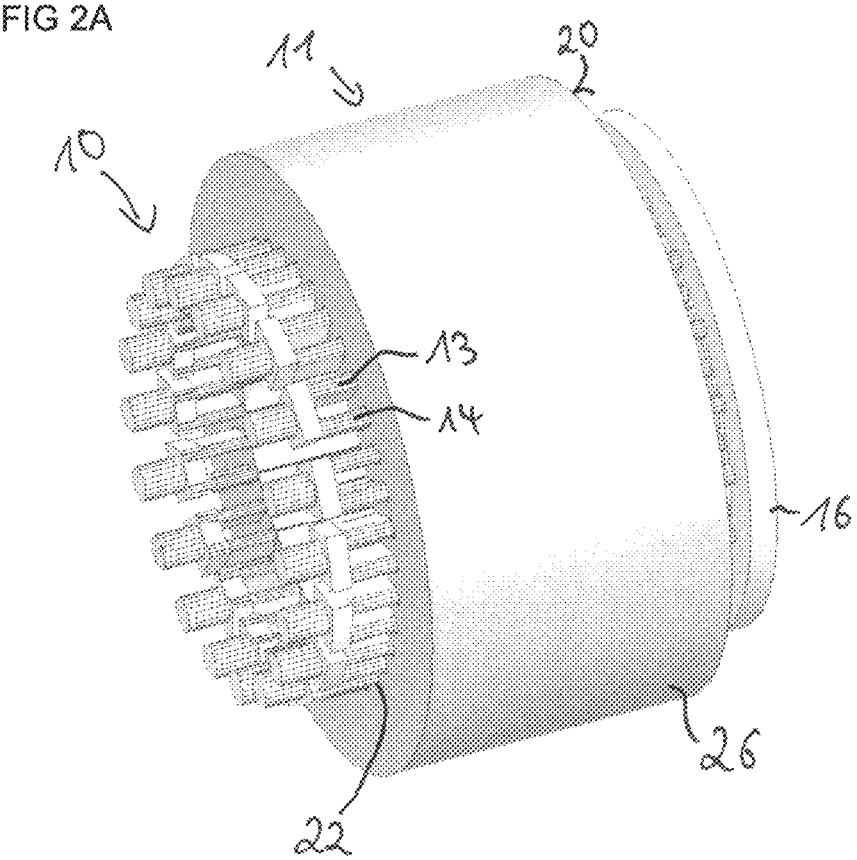
FIGS. 2A, 2B, 2C and 2D show embodiments of a stator and of the winding system.

FIG. 2A shows an embodiment of the winding system 10 having a stator 11. The stator 11 comprises a laminated stator core 26 into which slots 22 are introduced. A conductor segment 13, 14 is located in each slot 22. The conductor segments 13, 14 are disposed around the circumference of the stator 11 and equidistant. The first conductor segments 13 are electrically conductively connected to each other at a first side 20 of the stator 11 using a first short-circuit means 16. The second conductor segments 14 are electrically conductively connected to each other at the first side 20 of the stator 11 using a second short-circuit means 17. The conductor segments 13, 14 form an electric winding of the stator 11. One first conductor segment 13 and one second conductor segment 14 are in each case connected to one half-bridge 15 on the side of the stator 11 which faces away from the first side 20. This half-bridge 15 is not shown in FIG. 2A. A rotor 27 of the electric machine 12 can be disposed in the stator 11.

Figure 2B:
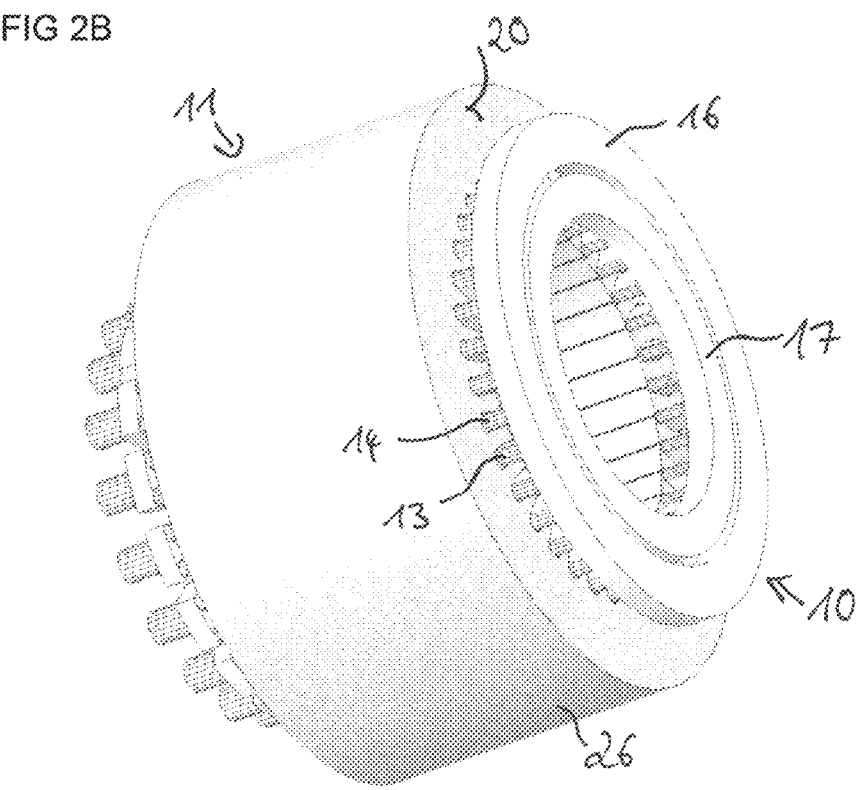

FIG. 2B shows a view from the first side 20 of the embodiment from FIG. 2A. The first short-circuit means 16 has a larger diameter than the second short-circuit means 17. The two short-circuit means 16, 17 are disposed at a distance from each other. The first short-circuit means 16 and the second short-circuit means 17 are disposed at different radial positions along a cross-section through the stator 11. The first and second short-circuit means 16, 17 are disposed at the same position along an axis of rotation of the stator 11.

Figure 2C:
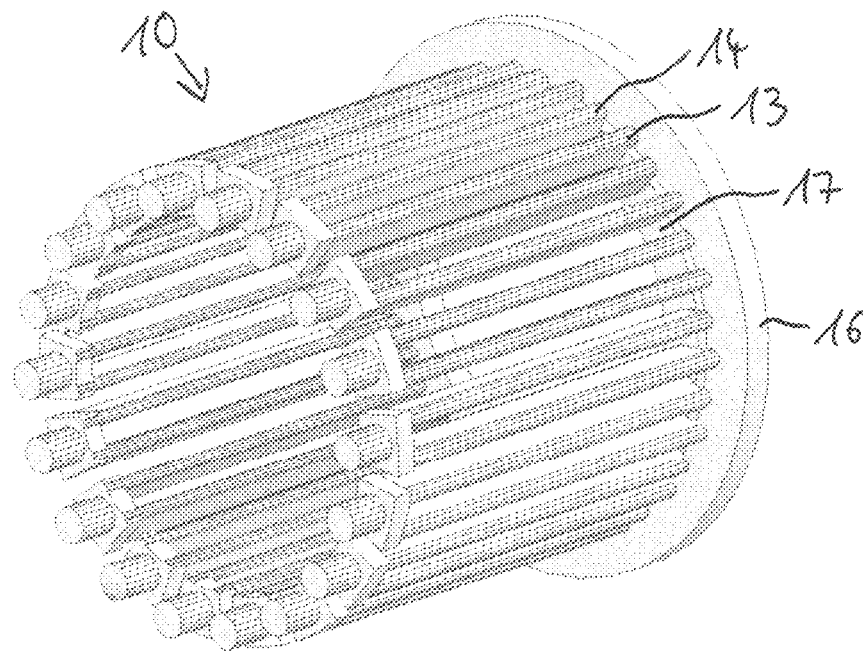

FIG. 2C shows the embodiment of the winding system 10 from FIGS. 2A and 2B without the stator 11 and without the laminated stator core 26. The first and second conductor segments 13, 14 extend as rectilinear bars from the first side 20 along the laminated stator core 26.

Figure 2D:
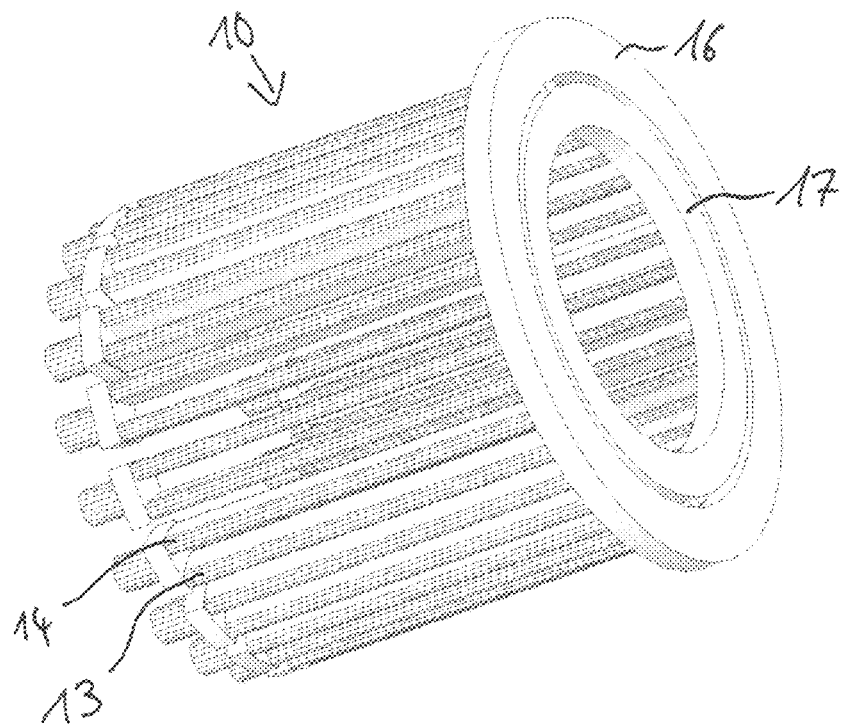

FIG. 2D shows a view from the first side 20 of the embodiment of the winding system 10 from FIG. 2C. As shown in FIG. 2B, the short-circuit means 16, 17 have different diameters.

Figure 3A:
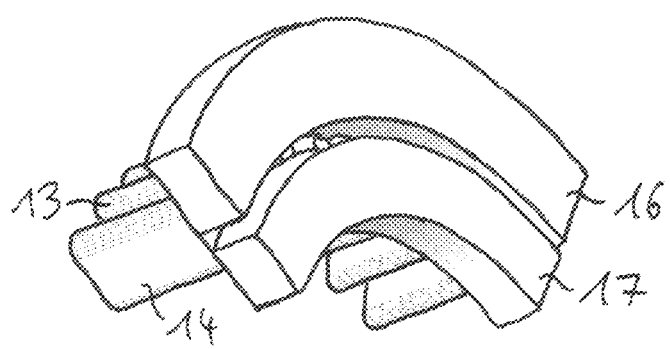
FIGS. 3A, 3B, 3C and 3D show details of an embodiment of the winding system.

FIG. 3A shows a detail of the two short-circuit means 16, 17 with some conductor segments 13, 14. As in the embodiment in FIGS. 2A to 2D, the first short-circuit means 16 has a larger diameter than the second short-circuit means 17. The first short-circuit means 16 is connected to the first conductor segments 13 and the second short-circuit means 17 is connected to the second conductor segments 14. The two short-circuit means 16, 17 together have a greater radial extension than the conductor segments 13, 14.

Figure 3B:
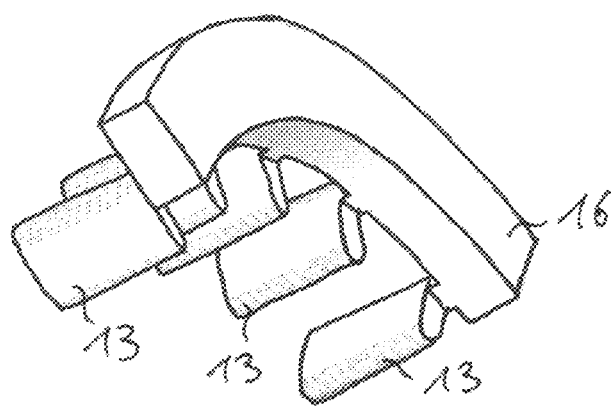

FIG. 3B shows the detail from FIG. 3A without the second short-circuit means 17 and without the second conductor segments 14. The first conductor segments 13 are in direct contact with the first short-circuit means 16 with a part of their cross-sectional area.

Figure 3C:
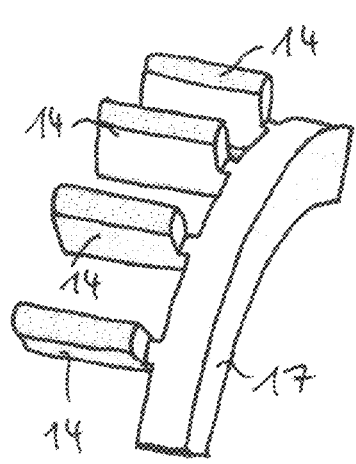

FIG. 3C shows the detail from FIG. 3A without the first short-circuit means 16 and without the first conductor segments 13. The second conductor segments 14 are in direct contact with the second short-circuit means 17 with a part of their cross-sectional area. Since the conductor segments 13, 14 are only in direct contact with one of the short-circuit means 16, 17 with a part of their cross-sectional area, the conductor segments 13, 14 can be disposed next to each other around the circumference of the stator 11 and at the same time, the first conductor segments 13 are connected to the first short-circuit means 16 and the second conductor segments 14 are connected to the second short-circuit means 17.

Figure 3D:
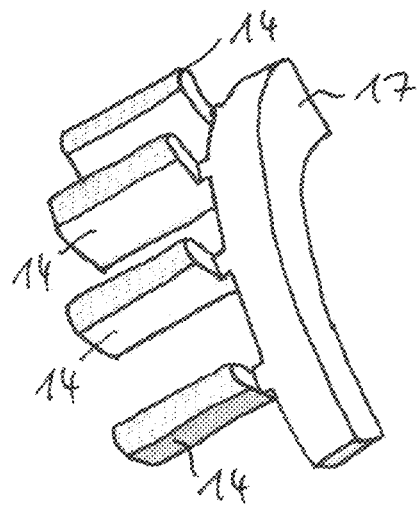

FIG. 3D shows the same detail as in FIG. 3C from a different viewing angle.

Figure 4A:
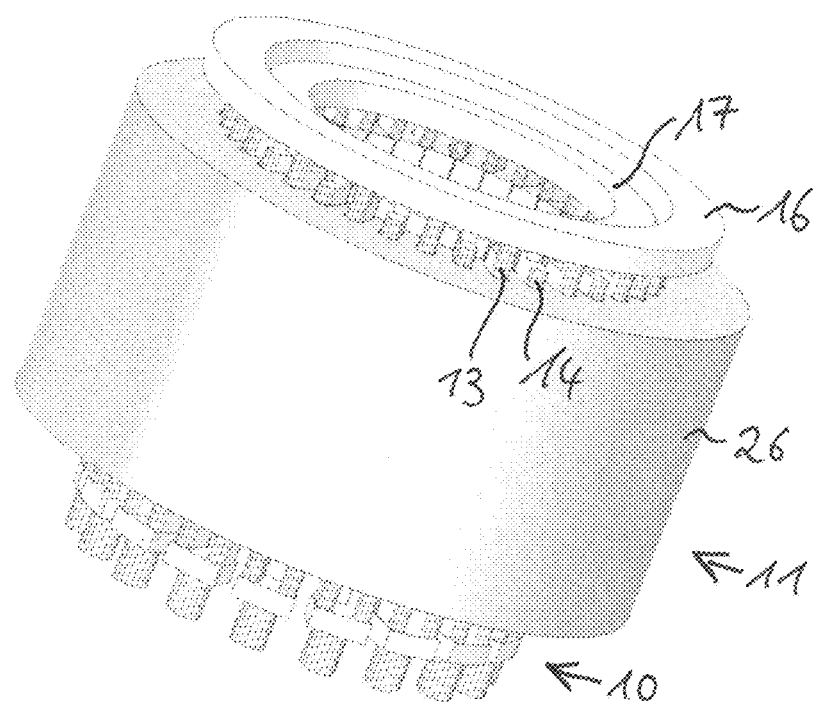
FIGS. 4A and 4B show further embodiments of a stator and of the winding system.

FIG. 4A shows a further embodiment of the winding system 10 having a stator 11. The structure in FIG. 4A differs from the structure shown in FIG. 2A only in that the first and second short-circuit means 16, 17 are disposed at different positions along the axis of rotation of the stator 11. This means that the second short-circuit means 17 is located closer to the laminated stator core 26 than the first short-circuit means 16.

Figure 4B:
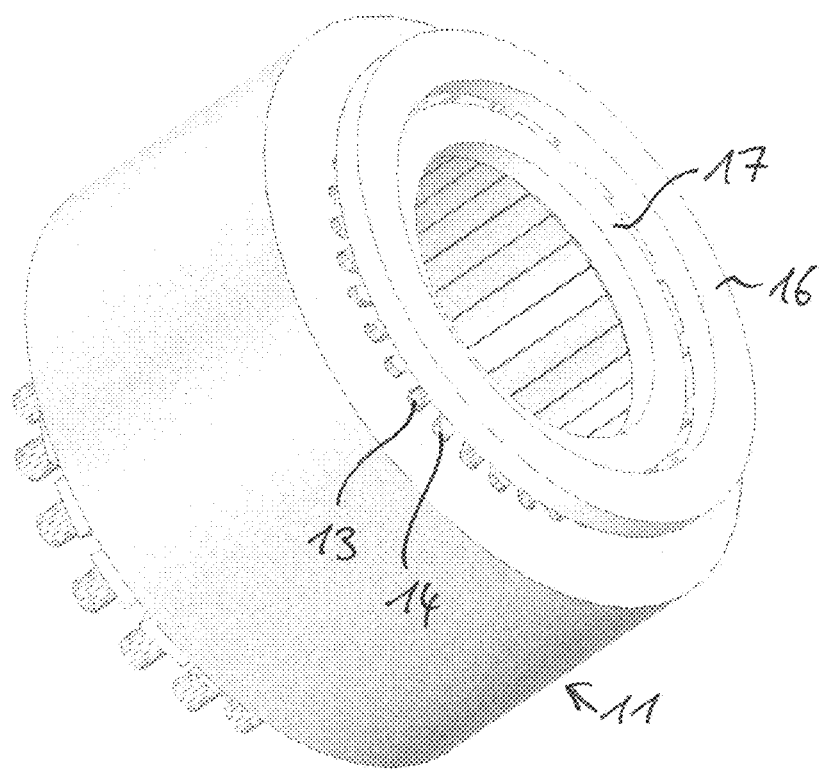

FIG. 4B shows the embodiment of FIG. 4A from a different viewing angle.

Figure 5A:
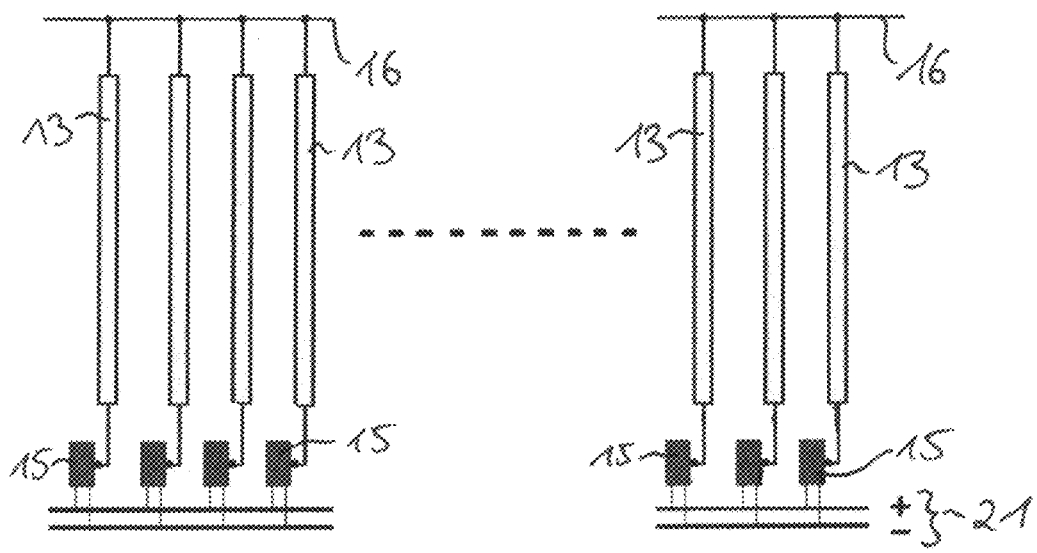
FIGS. 5A, 5B, 5C, 5D and 5E show the structure and magnetomotive force for a winding system having one short-circuit means.

FIG. 5A schematically shows the structure of a winding system having one short-circuit means 16. The winding system comprises 36 conductor segments 13 and 36 half-bridges 15. Seven of the conductor segments 13 and the half-bridges 15 are illustrated by way of example. The 36 conductor segments 13 are all connected to one short-circuit means 16. The half-bridges 15 are connected to a power supply unit 21.

Figure 5B:
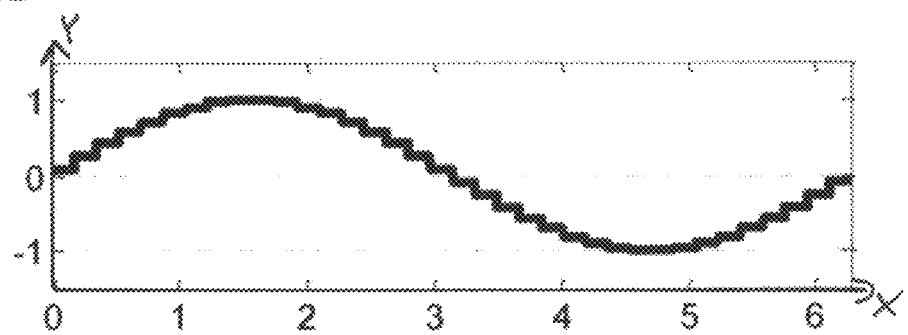

FIG. 5B shows the magnetomotive force of a magnetic field of a stator with the winding system of FIG. 5A. The angle is plotted in radians on the x-axis and on the y-axis, the magnetomotive force is plotted normalized to 1. The magnetic field generated by the stator has two poles. The magnetomotive force has the shape of a step function, which has approximately the shape of a sine function.

Figure 5C:
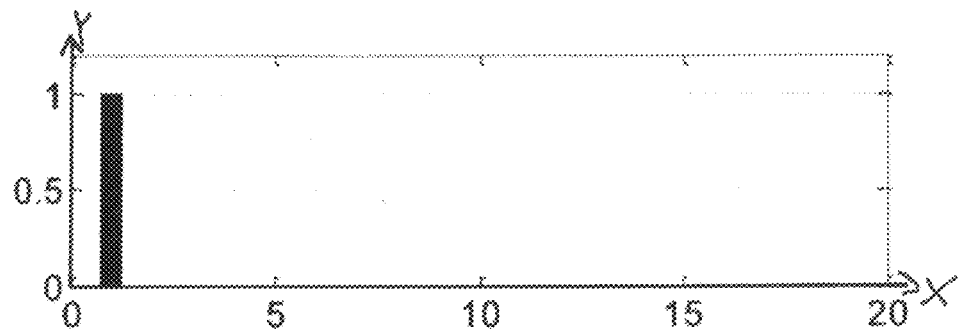

FIG. 5C illustrates the harmonic components of a magnetic field that can be generated by a stator with a winding system from FIG. 5A. The magnetic field has two poles, as in FIG. 5B. The magnetic field of the stator can be decomposed into its harmonic components by means of a Fourier analysis. The harmonic components are plotted on the x-axis and on the y-axis, the magnetomotive force is plotted normalized to 1. The magnetic field generated by the stator thus has only one component with harmonic order 1. This harmonic order corresponds to the number of pole pairs of the magnetic field.

Figure 5D:
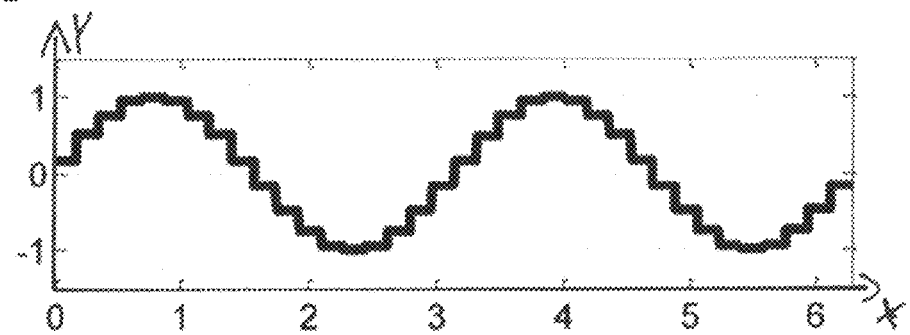

FIG. 5D shows the magnetomotive force of a magnetic field of a stator with the winding system of FIG. 5A. The angle is plotted in radians on the x-axis and on the y-axis, the magnetomotive force is plotted normalized to 1. The magnetic field generated by the stator has four poles. The magnetomotive force has the shape of a step function, which has approximately the shape of a sine function with two maxima and two minima.

Figure 5E:
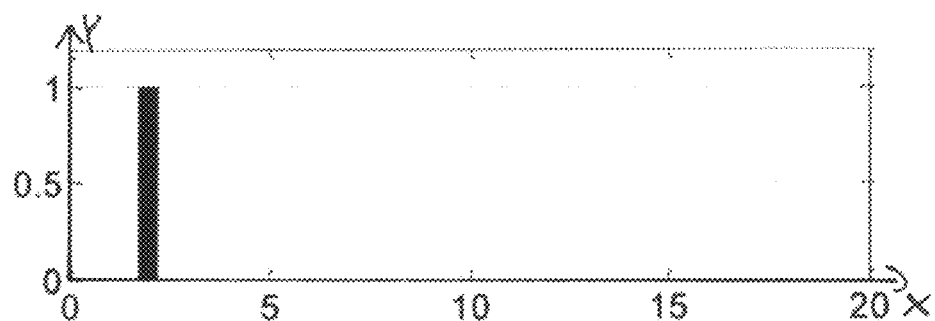

FIG. 5E illustrates the harmonic components of a magnetic field that can be generated by a stator with a winding system from FIG. 5A. The magnetic field has four poles, as in FIG. 5D. The harmonic components are plotted on the x-axis and on the y-axis, the magnetomotive force is plotted normalized to 1. The magnetic field generated by the stator thus has only one component with harmonic order 2. This harmonic order corresponds to the number of pole pairs of the magnetic field.

Figure 6A:
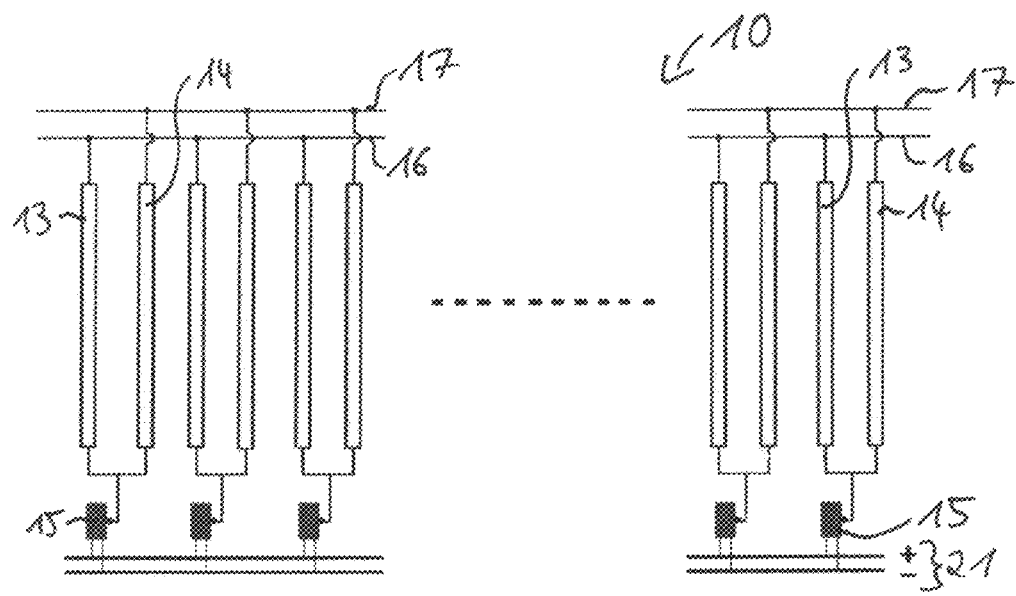
FIGS. 6A, 6B, 6C, 6D and 6E show the structure and magnetomotive force for a winding system having two short-circuit means.

FIG. 6A shows a further embodiment of the winding system 10. The winding system 10 comprises 18 first conductor segments 13 and 18 second conductor segments 14. In addition, the winding system 10 comprises 18 half-bridges 15. Each half-bridge 15 is connected to a first conductor segment 13 and a second conductor segment 14. Each first conductor segment 13 is connected to the first short-circuit means 16 and each second conductor segment 14 is connected to the second short-circuit means 17. The half-bridges 15 are connected to a power supply unit 21. Five first and second conductor segments 13, 14 and five half-bridges 15 are shown in FIG. 6A by way of example.

Figure 6B:
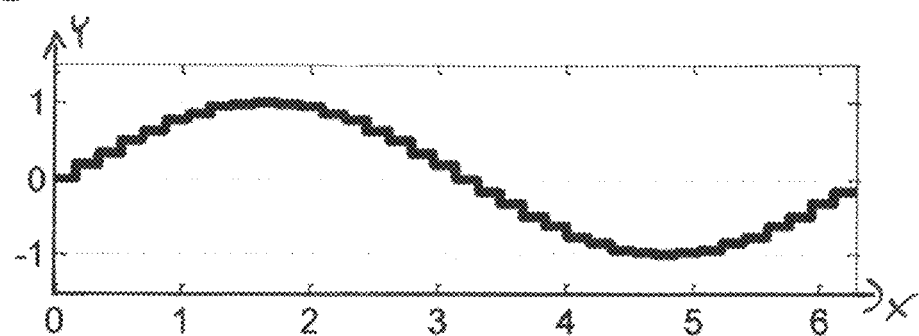

FIG. 6B shows the magnetomotive force for a magnetic field that can be generated by a stator 11 with the winding system 10 of FIG. 6A. The angle is plotted in radians on the x-axis and on the y-axis, the magnetomotive force is plotted normalized to 1. The magnetic field generated by the stator 11 has two poles. The magnetomotive force has the shape of a step function, which has approximately the shape of a sine function. The magnetomotive force has approximately the same shape as shown in FIG. 5B. Only half as many half-bridges 15 are required to generate an approximately equal magnetomotive force in the embodiment from FIG. 6A compared with the winding system from FIG. 5A. The complexity and cost of the winding system 10 can thus be reduced.

Figure 6C:
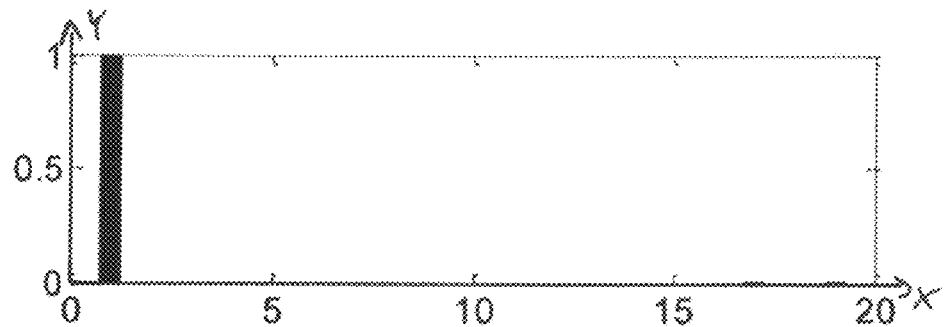

FIG. 6C illustrates the harmonic components of a magnetic field that can be generated by a stator 11 with a winding system 10 from FIG. 6A. The magnetic field has two poles, as in FIG. 6B. The harmonic components are plotted on the x-axis and on the y-axis, the magnetomotive force is plotted normalized to 1. The magnetic field generated by the stator 11 has one component with the harmonic order 1 and two further components with a higher harmonic order and significantly lower amplitude. The harmonic order 1 corresponds to the number of pole pairs of the magnetic field. If only the harmonic order 1 is used to generate a torque, the components with different harmonic orders generate losses. However, the losses are very low in this example.

Figure 6D:
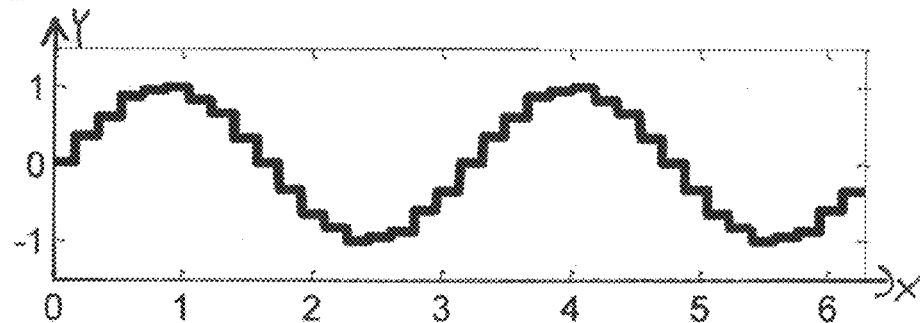

FIG. 6D shows the magnetomotive force for a magnetic field that can be generated by a stator 11 with the winding system 10 of FIG. 6A. The angle is plotted in radians on the x-axis and on the y-axis, the magnetomotive force is plotted normalized to 1. The magnetic field generated by the stator 11 has four poles. The magnetomotive force has the shape of a step function, which has approximately the shape of a sine function with two maxima and two minima. Also in this case, the shape of the magnetomotive force approximately corresponds to the shape of the magnetomotive force shown in FIG. 5D.

Figure 6E:
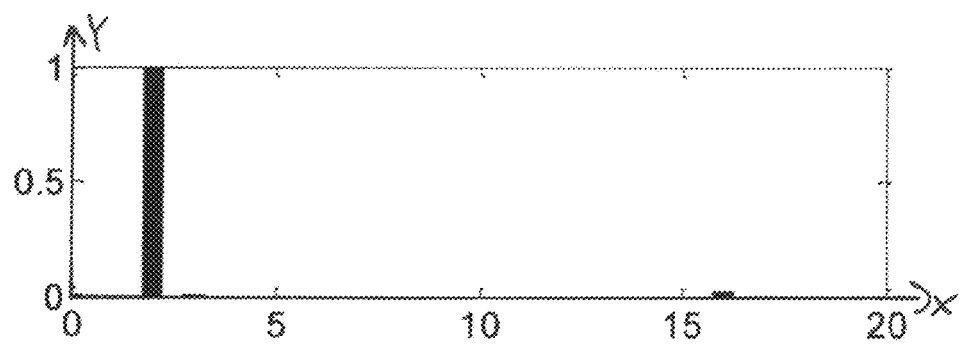

FIG. 6E illustrates the harmonic components of a magnetic field that can be generated by a stator 11 with a winding system 10 from FIG. 6A. The magnetic field has four poles, as in FIG. 6D. The harmonic components are plotted on the x-axis and on the y-axis, the magnetomotive force is plotted normalized to 1. The magnetic field generated by the stator 11 has a component with the harmonic order 2 and two further components with a higher harmonic order and significantly lower amplitude. The harmonic order 2 corresponds to the number of pole pairs of the magnetic field. Also in this example, the losses caused by components of higher harmonic orders are very low.

Figure 7A:
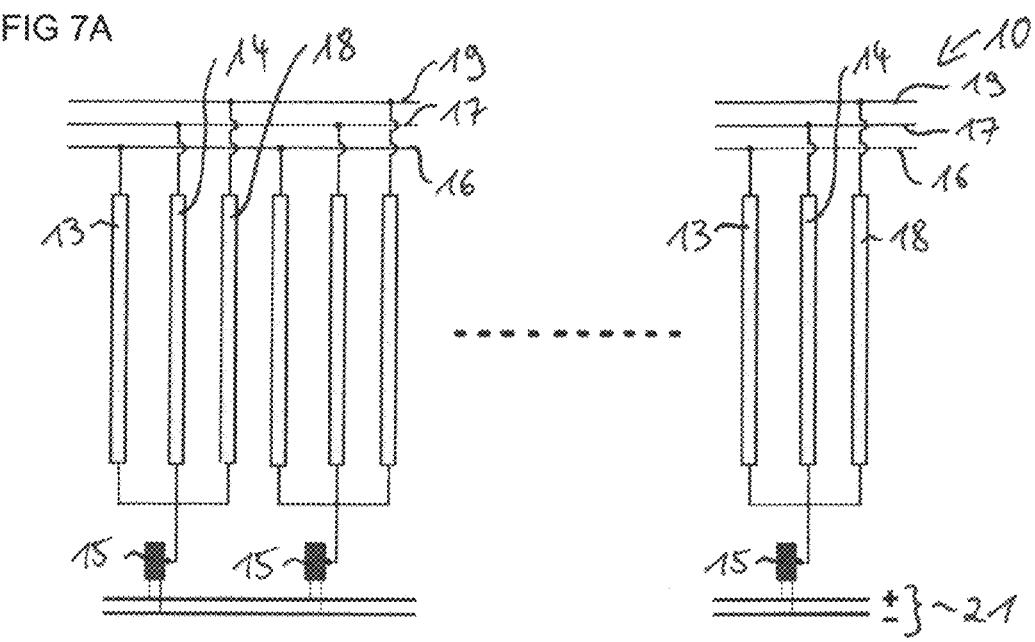
FIGS. 7A, 7B, 7C, 7D and 7E show the structure and magnetomotive force for a winding system having three short-circuit means.

FIG. 7A shows another embodiment of the winding system 10. The winding system 10 comprises twelve first conductor segments 13, twelve second conductor segments 14 and twelve third conductor segments 18. In addition, the winding system 10 comprises twelve half-bridges 15. The first conductor segments 13 are connected to the first short-circuit means 16. The second conductor segments 14 are connected to the second short-circuit means 17. The third conductor segments 18 are connected to the third short-circuit means 19. Each half-bridge 15 is connected to one first conductor segment 13, one second conductor segment 14 and one third conductor segment 18. Further, the half-bridges 15 are connected to the power supply unit 21.

Figure 7B:
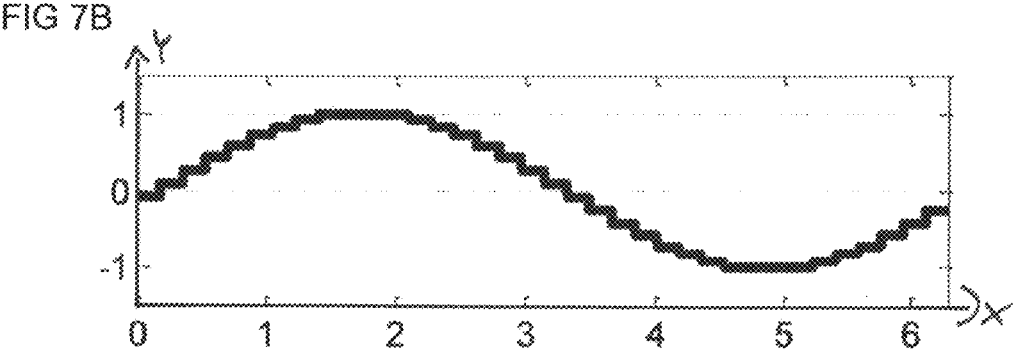

FIG. 7B shows the magnetomotive force for a magnetic field that can be generated by a stator 11 with the winding system 10 of FIG. 7A. The angle is plotted in radians on the x-axis and on the y-axis, the magnetomotive force is plotted normalized to 1. The magnetic field generated by the stator 11 has two poles. The magnetomotive force has the shape of a step function, which has approximately the shape of a sine function. The magnetomotive force has approximately the same shape as shown in FIG. 5B. Only one third of the number of half-bridges 15 is required to generate an approximately equal magnetomotive force in the embodiment from FIG. 7A compared with the winding system from FIG. 5A. The complexity and cost of the winding system 10 can thus be reduced.

Figure 7C:
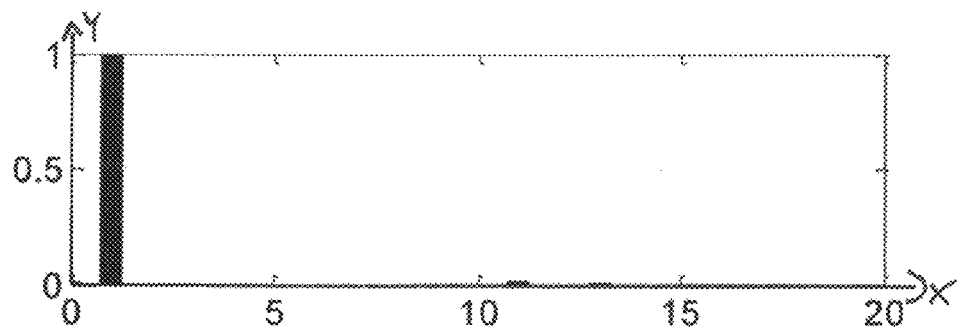

FIG. 7C illustrates the harmonic components of a magnetic field that can be generated by a stator 11 with a winding system 10 from FIG. 7A. The magnetic field has two poles, as in FIG. 7B. The harmonic components are plotted on the x-axis and on the y-axis, the magnetomotive force is plotted normalized to 1. The magnetic field generated by the stator 11 has one component with the harmonic order 1 and two further components with a higher harmonic order and significantly lower amplitude. The harmonic order 1 corresponds to the number of pole pairs of the magnetic field. If only the harmonic order 1 is used to generate a torque, the components with other harmonic orders generate losses. However, the losses are very low in this example.

Figure 7D:
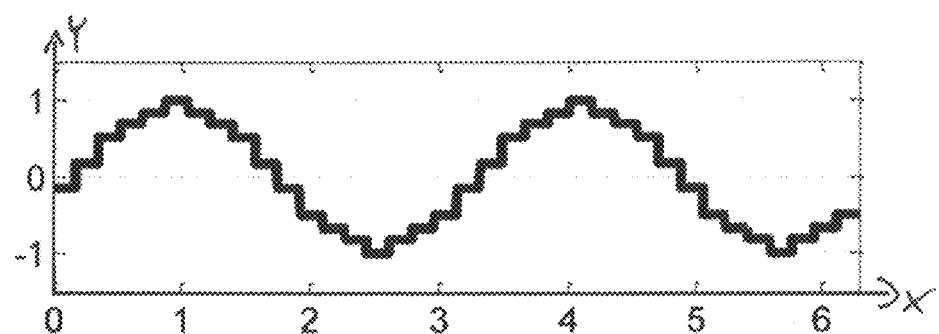

FIG. 7D shows the magnetomotive force for a magnetic field that can be generated by a stator 11 with the winding system 10 of FIG. 7A. The angle is plotted in radians on the x-axis and on the y-axis, the magnetomotive force is plotted normalized to 1. The magnetic field generated by the stator 11 has four poles. The magnetomotive force has the shape of a step function, which has approximately the shape of a sine function with two maxima and two minima. Also in this case, the shape of the magnetomotive force approximately corresponds to the shape of the magnetomotive force shown in FIG. 5D.

Figure 7E:
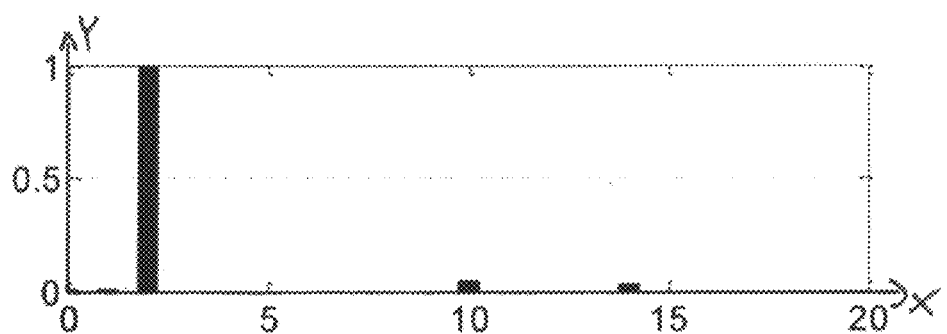

FIG. 7E illustrates the harmonic components of a magnetic field that can be generated by a stator 11 with a winding system 10 from FIG. 7A. The magnetic field has four poles, as in FIG. 7D. The harmonic components are plotted on the x-axis and on the y-axis, the magnetomotive force is plotted normalized to 1. The magnetic field generated by the stator 11 has one component with the harmonic order 2, one component with the harmonic order 1 and two further components with a higher harmonic order and significantly lower amplitude. The harmonic order 2 corresponds to the number of pole pairs of the magnetic field. Also in this example, the losses caused by components of higher harmonic orders are very low.

Figure 8A:
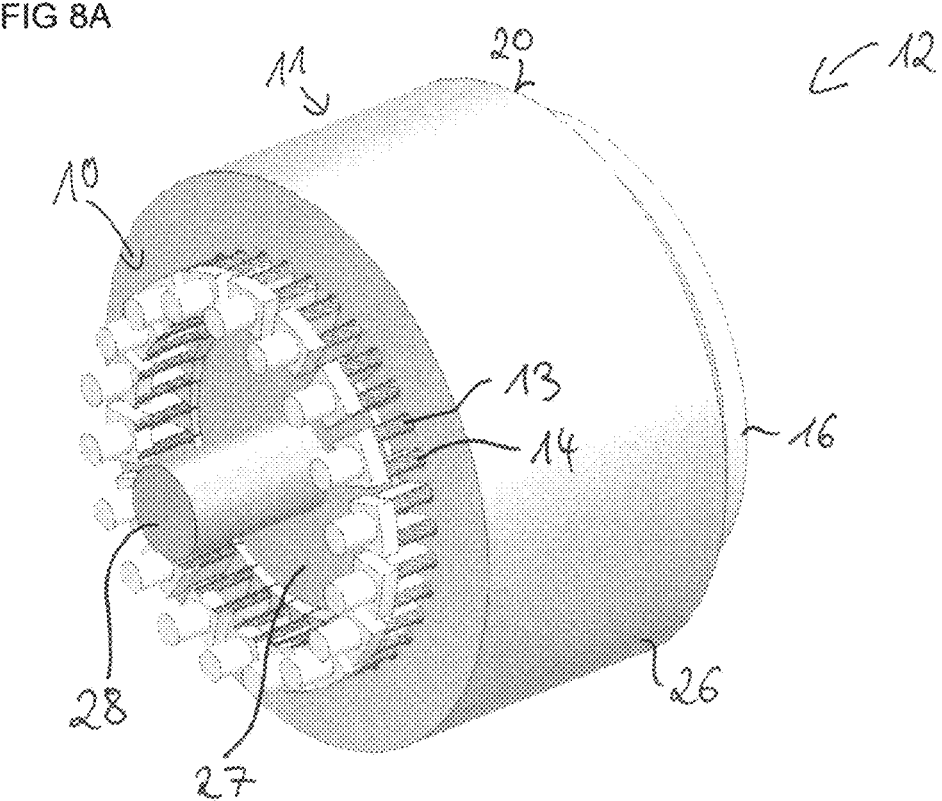
FIGS. 8A and 8B show an embodiment of an electric machine.

FIG. 8A shows an embodiment of an electric machine 12. The electric machine 12 comprises a stator 11 having a winding system 10 as shown in FIG. 2A. In addition, the electric machine 12 comprises a rotor 27 rotatably mounted to the stator 11. As described above, the stator 11 comprises a laminated stator core 26 into which slots 22 are introduced. The winding system 10 comprises first conductor segments 13 and second conductor segments 14. A conductor segment 13, 14 is located in each slot 22. The conductor segments 13, 14 are disposed around the circumference of the stator 11 and equidistant. The first conductor segments 13 are electrically conductively connected to a first short-circuit means 16 on a first side 20 of the stator 11. The second conductor segments 14 are electrically conductively connected to each other at the first side 20 with a second short-circuit means 17, wherein the second short-circuit means 17 is not shown in FIG. 8A. The rotor 27 is disposed on a shaft 28. The rotor 27 is an inner rotor and disposed inside the stator 11. Since the conductor segments 13, 14 are distributed along the circumference of the stator 11, during operation of the electric machine 12, the stator 11 can generate a rotating field in which the number of pole pairs can be variable. The rotating field can drive the rotor 27 during operation of the electric machine 12.

Figure 8B:
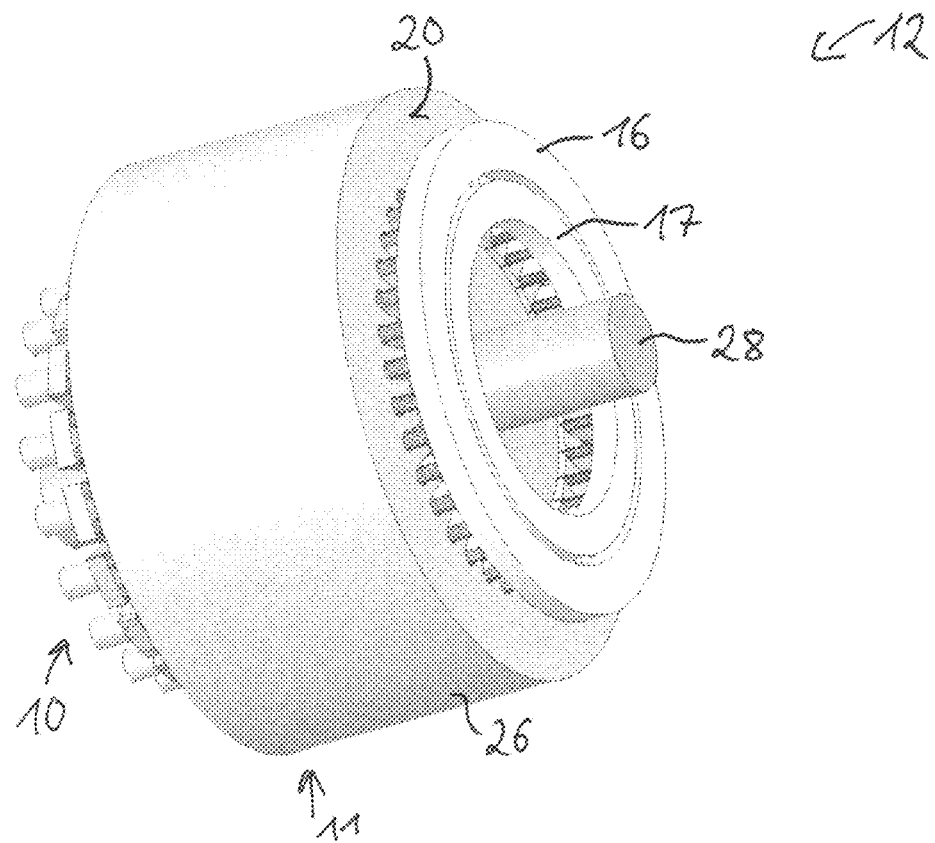

FIG. 8B shows a view from the first side 20 of the embodiment of the electric machine 12 from FIG. 8B. The first short-circuit means 16 has a larger diameter than the second short-circuit means 17. The two short-circuit means 16, 17 are disposed at a distance from each other.

LIST OF REFERENCE NUMBERS

10: winding system
11: stator
12: electric machine
13: first conductor segment
14: second conductor segment 15: half-bridge
16: first short-circuit means
17: second short-circuit means
18: third conductor segment
19: third short-circuit means
20: first side
21: power supply unit
22: slot
23: first connection
24: second connection
25: switch
26: laminated stator core
27: rotor
28: shaft

The invention claimed is:

1. A winding system for a stator of an electric machine, comprising:
    at least two first conductor segments and at least two second conductor segments,
    at least two half-bridges,
    at least one first short-circuit means and at least one second short-circuit means,
    each half-bridge being connected to at least one first conductor segment and one second conductor segment,
    each first conductor segment being connected to the first short-circuit means, and
    each second conductor segment being connected to the second short-circuit means.

2. The winding system according to claim 1, wherein the conductor segments each comprises a single conductor or each comprises a plurality of conductor filaments disposed parallel to each other and electrically connected in parallel.

3. The winding system according to claim 1, wherein the conductor segments are designed rectilinear and disposed parallel to each other.

4. The winding system according to claim 1, wherein the conductor segments are distributed along a circumference of the stator.

5. The winding system according to claim 1, wherein the number of conductor segments which are connected to the same half-bridge corresponds to the number of short-circuit means of the winding system.

6. The winding system according to claim 1, wherein the winding system comprises at least one third conductor segment and at least one third short-circuit means, wherein each third conductor segment is connected to the third short-circuit means.

7. The winding system according to claim 1, wherein the at least two half-bridges are connected to a power supply unit.

8. The winding system according to claim 1, wherein each of the at least two half-bridges is set up to provide its own phase current.

9. The winding system according to the preceding claim 8, wherein the phase currents are out of phase with each other.

10. The winding system according to claim 1, wherein the short-circuit means are disposed radially along a cross-section through the stator.

11. The winding system according to claim 1, wherein the short-circuit means are disposed at different positions along an axis of rotation of the stator.

12. An electric machine, having:
    a stator with a winding system according to claim 1, and
    a rotor rotatably mounted to the stator.

13. The electric machine according to claim 12, in which the stator is designed to generate at least one rotating field in which the number of pole pairs is variable.

14. The electric machine according to claim 12, in which the stator comprises a plurality of slots, wherein exactly one conductor segment of the winding system is placed per slot.

* * * * *